United States Patent [19]

O'Connor et al.

[11] Patent Number: 5,155,061
[45] Date of Patent: Oct. 13, 1992

[54] METHOD FOR FABRICATING A SILICON PRESSURE SENSOR INCORPORATING SILICON-ON-INSULATOR STRUCTURES

[75] Inventors: James M. O'Connor, Ellicott City; John B. McKitterick, Columbia, both of Md.

[73] Assignee: Allied-Signal Inc., Morris Township, Morris County, N.J.

[21] Appl. No.: 709,543

[22] Filed: Jun. 3, 1991

[51] Int. Cl.⁵ .................. H01L 21/18; H01L 21/302
[52] U.S. Cl. ........................... 437/86; 437/901; 437/966; 437/974; 437/927; 148/DIG. 12; 148/DIG. 159; 357/26; 73/754
[58] Field of Search .... 148/33.2, DIG. 12, DIG. 135, 148/DIG. 159, DIG. 73; 357/26; 437/86, 901, 966, 974; 73/754

[56] References Cited

U.S. PATENT DOCUMENTS

| | | | |
|---|---|---|---|
| 3,851,280 | 11/1974 | Staples | 333/30 R |
| 3,922,705 | 11/1975 | Yerman | 357/26 |
| 3,978,508 | 8/1976 | Vilkomerson | 357/26 |
| 4,035,822 | 7/1977 | Vilkomerson | 357/26 |
| 4,177,496 | 12/1979 | Bell et al. | 361/283 |
| 4,184,189 | 1/1980 | Davis et al. | 361/283 |
| 4,208,782 | 6/1980 | Kurtz et al. | 29/580 |
| 4,291,293 | 9/1981 | Yamada et al. | 338/4 |
| 4,400,869 | 8/1983 | Wilner et al. | 29/576 C |
| 4,405,970 | 9/1983 | Swindal et al. | 361/283 |
| 4,410,871 | 10/1983 | Mallon et al. | 338/5 |
| 4,459,855 | 7/1984 | Yamagami | 73/727 |
| 4,495,820 | 1/1985 | Shimada et al. | 73/724 |
| 4,628,403 | 12/1986 | Kuisma | 361/283 |
| 4,670,969 | 6/1987 | Yamada et al. | 29/576 E |
| 4,721,938 | 1/1988 | Stevenson | 338/4 |
| 4,802,952 | 2/1989 | Kobori et al. | 156/634 |
| 4,812,888 | 3/1989 | Blackburn | 357/26 |
| 4,849,374 | 7/1989 | Chen et al. | 437/209 |
| 4,894,698 | 1/1990 | Hijikigawa et al. | 357/26 |
| 4,908,693 | 3/1990 | Nishiguchi | 357/68 |
| 4,908,921 | 3/1990 | Chen et al. | 29/25.41 |

FOREIGN PATENT DOCUMENTS 230188 1/1990 Japan ................... 437/901

OTHER PUBLICATIONS

Steinbrüchel, C. "The Mechanical Field Effect Transistor, A New Force Sensor, ", J. Vac. Sci. Technol. A 7(3) May 6, 1989. pp. 847-849.

Primary Examiner—Olik Chaudhuri
Assistant Examiner—G. Fourson
Attorney, Agent, or Firm—Howard G. Massung

[57] ABSTRACT

A method for fabricating an all silicon absolute pressure sensor employing silicon-on-insulator structures. More particularly, a method for fabricating an all silicon absolute pressure sensor based upon an ungated metal-oxide semiconductor field-effect transistor which offers a high degree of immunity to temperature effects, increased reliability, minimal substrate parasitics, reduced manufacturing variations from device to device, as well as inexpensive and simple fabrication.

6 Claims, 6 Drawing Sheets

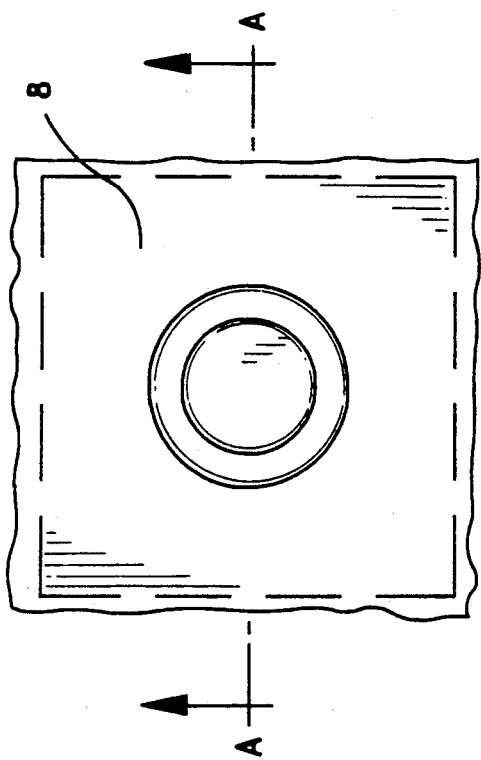
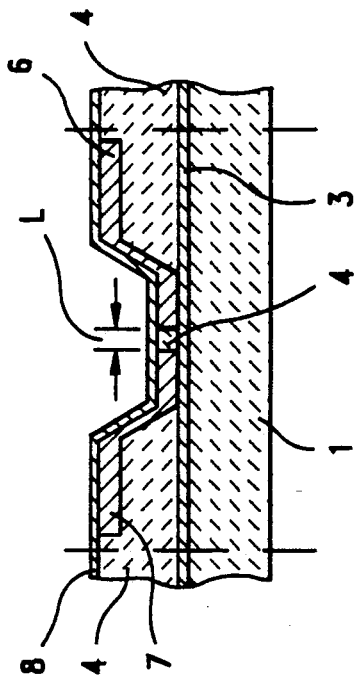
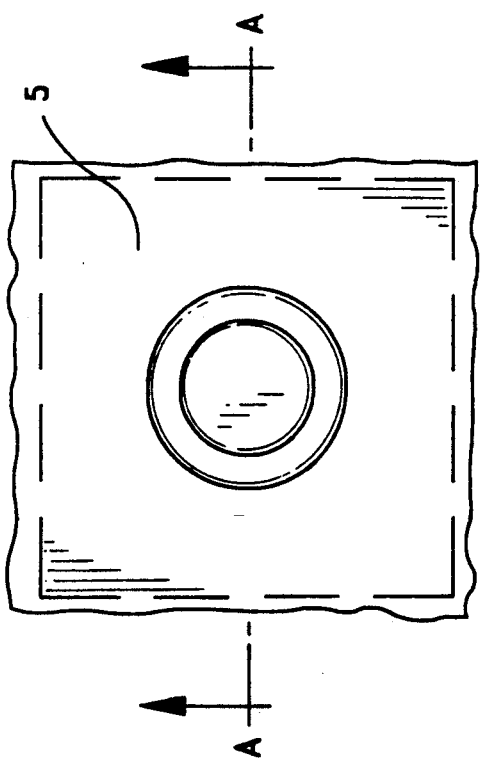
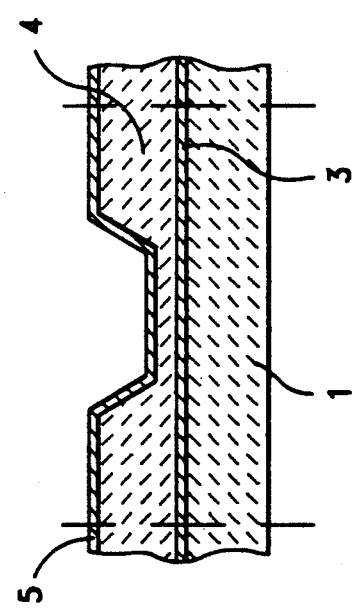

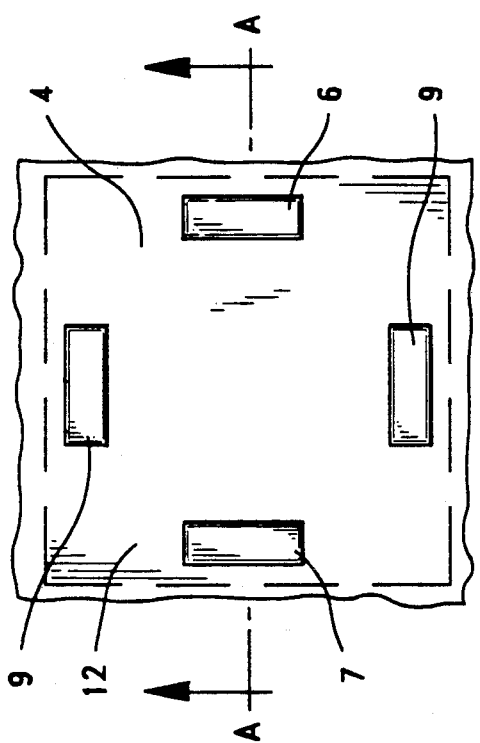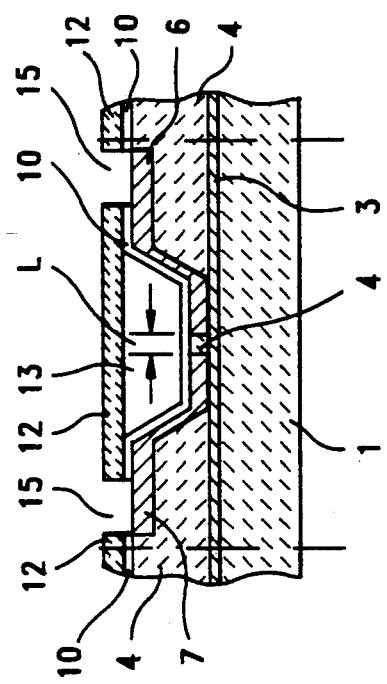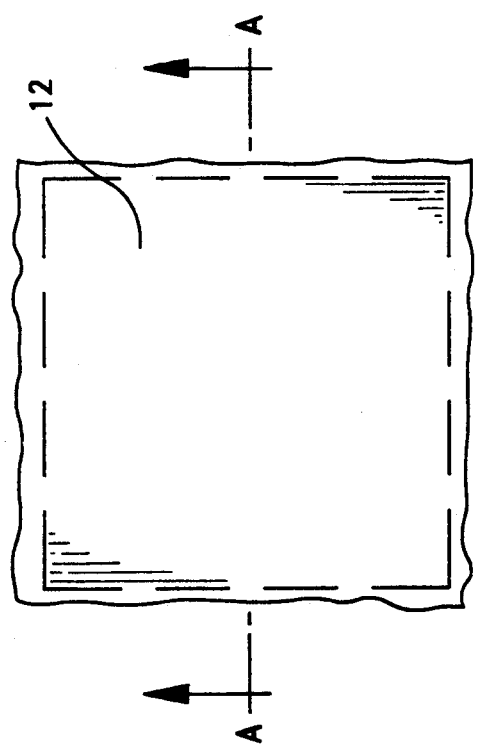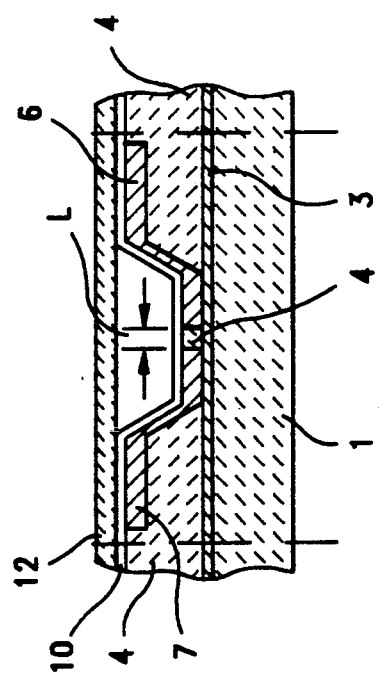

METHOD FOR FABRICATING A SILICON PRESSURE SENSOR INCORPORATING SILICON-ON-INSULATOR STRUCTURES

BACKGROUND OF THE INVENTION

The present invention relates to a method for fabricating a pressure sensor entirely from silicon. More particularly, a method is disclosed for fabricating a pressure sensor incorporating Silicon-On-Insulator ("SOI") material, and offering a high degree of immunity to temperature effects, increased reliability, minimal substrate parasitics, and reduced manufacturing variations from device to device. Additionally, the sensor architecture and fabrication method disclosed allow for the production of an inexpensive, simple and reliable device.

The prior art contains many different kinds of monolithic silicon absolute pressure sensors; virtually all of them measure the pressure required to deflect a thin diaphragm, usually made of silicon or silicon dioxide, which forms one wall of a vacuum-sealed reference cavity. Generally, the diaphragm deflection results in either a change in the capacitance between electrodes mounted on the diaphragm and the base of the sensor (capacitance type sensor), or a stress build-up at the edge of the diaphragm which is sensed by a thin film or implanted resistor (piezoresistive type sensor). The electrical output of the devices is directly related to changes in pressure upon the diaphragm.

To date, the use of these types of sensors in high-performance applications has been limited due to a number of problems associated with their manufacture and operation. In addition, these sensors are typically very sensitive to temperature effects (especially the piezoresistive type sensors where the temperature dependence of the silicon material itself affects the electrical output). Temperature variations also have adverse effects upon the capacitive type sensors, as most of them employ metal film electrodes within their reference cavities. Differences in thermal expansion coefficients between the diaphragm (usually composed of silicon or silicon dioxide) and the metal film electrodes can result in changes in electrode separation as the temperature changes, causing false or misleading outputs. In severe cases, this effect could lead to the delamination of the metal film electrode from the diaphragm, or to the cracking of the diaphragm itself. Moreover, since the electrodes are inside of the reference cavity, metal leads to the outside must pass through a vacuum seal. These leads are prone to failure at these vacuum seal points when exposed to repeated temperature cycling.

The accuracy of these sensors has also been limited by the inability to hold tight tolerances on the diaphragm thickness during batch fabrication of these devices. Any variation in diaphragm thickness from device to device would result in a change in the amount of deflection which results from a given pressure differential, and therefore result in erroneous pressure readings. While this non-uniformity can be compensated for by individually calibrating each sensor, such a task would be time consuming and costly.

Accordingly, it is the object of the present invention to provide for a method of fabricating an all-silicon absolute pressure sensor employing SOI technology, which allows for improved operational temperature stability, reduced substrate parasitics, increased immunity to thermally induced mechanical fatigue, and tighter diaphragm thickness tolerance control from device to device. This sensor is based upon an ungated Metal-Oxide Semiconductor Field-Effect Transistor ("MOSFET"), the drain current (also referred to as "channel current") of which varies as a function of the deflection of a diaphragm located in close proximity to the device.

SUMMARY OF THE INVENTION

This invention provides for a method of fabricating an all-silicon absolute pressure sensor employing SOI technology. In a preferred embodiment, the sensor fabricated is an ungated MOSFET consisting of an evacuated reference cavity in which one wall is formed by a thin silicon diaphragm. The transistor is configured so that the drain current passing through it is a function of the deflection of the silicon diaphragm. Due to the device's architecture and the incorporation of SOI material, the disclosed invention offers several important improvements over the current state-of-the-art, including improved immunity to temperature effects, easier fabrication, better reliability, fewer sources of substrate parasitics, and reduced manufacturing variations from device to device. All of these advantages are crucial to the implementation of "smart" pressure sensors in aerospace applications.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which:

FIG. 4A is a top plane view of a portion of an SOI wafer being processed into the device of FIG. 1A, at a point in that process following the growth of the oxide used as a mask for the implantation of the source and drain electrodes.

FIG. 4B is a side cross-sectional view of the portion of the wafer of FIG. 4A, along the line A—A of that figure.

FIG. 5A is a top plane view of a portion of an SOI wafer being processed into the device of FIG. 1A, at a point in that process following the growth of the oxide used as a mask for the implantation of the p+ isolation ring.

FIG. 5B is a side cross-sectional view of the portion of the wafer of FIG. 5A, along the line A—A of that figure.

FIG. 8A is a top plane view of a portion of an SOI wafer being processed into the device of FIG. 1A, at a point in that process following the separation of the diaphragm layer from the diaphragm handle wafer bonding oxide.

FIG. 8B is a side cross-sectional view of the portion of the wafer of FIG. 8A, along the line A—A of that figure.

FIG. 9A is a top plane view of a portion of an SOI wafer being processed into the device of FIG. 1A, at a point in that process following the opening of apertures for contact pads.

FIG. 9B is a side cross-sectional view of the portion of the wafer of FIG. 9A, along the line A—A of that figure.

Note that in FIGS. 2A-9A and 2B-9B the dotted lines represent the boundaries along which a single completed sensor would be diced or sawed from the silicon wafer being processed.

DETAILED DESCRIPTION OF THE INVENTION

Figure 1A:
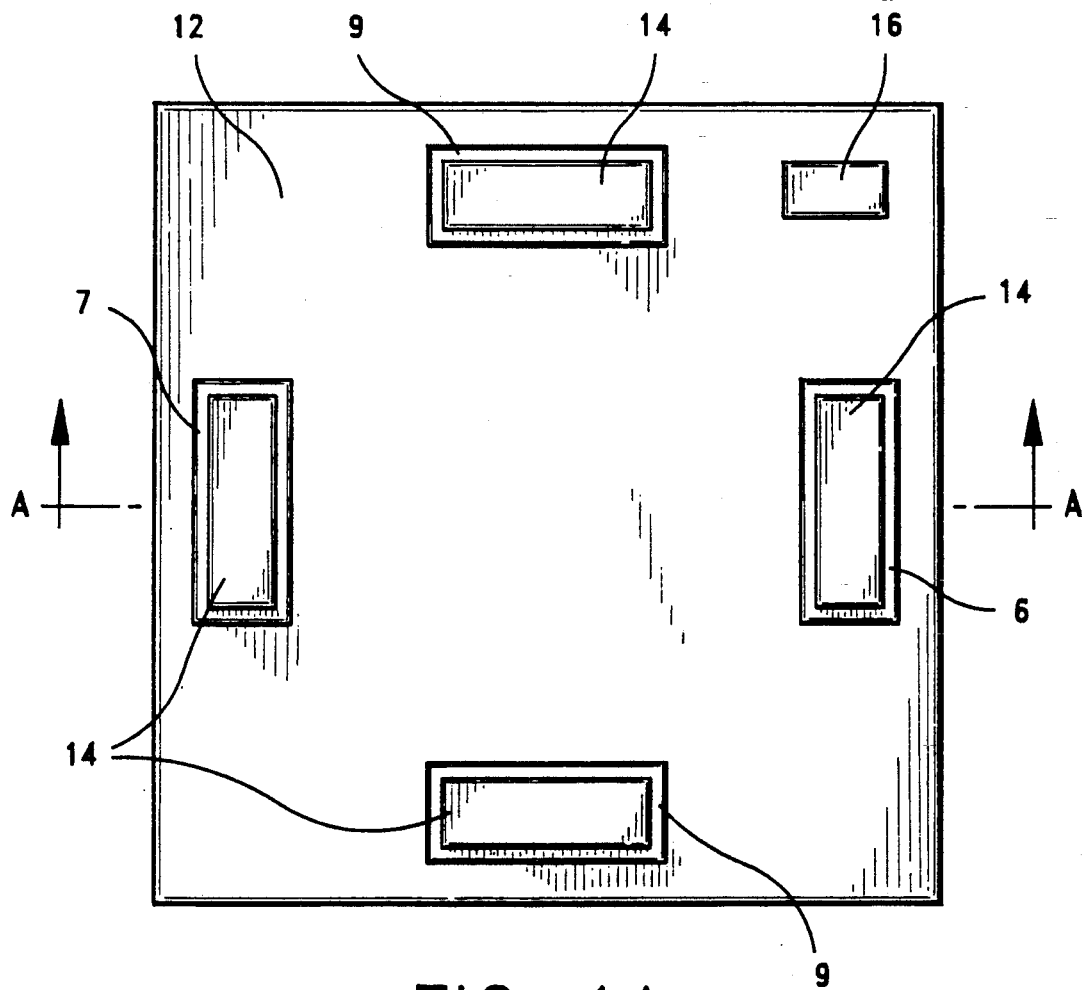
FIG. 1A is a top plane view of a preferred embodiment of the silicon pressure sensor.
Figure 1B:
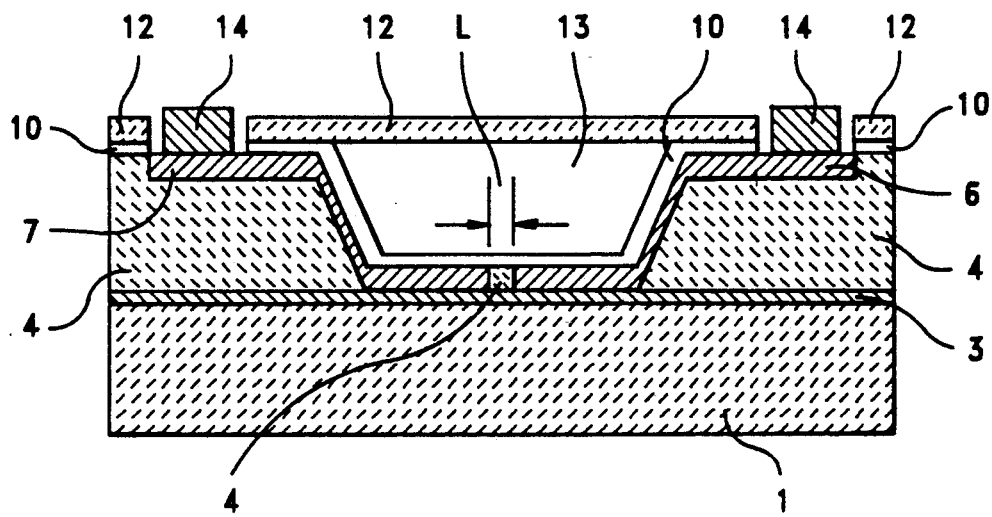
FIG. 1B is a side cross-sectional view of the device of FIG. 1A, along the line A—A of that figure.
Figure 3A:
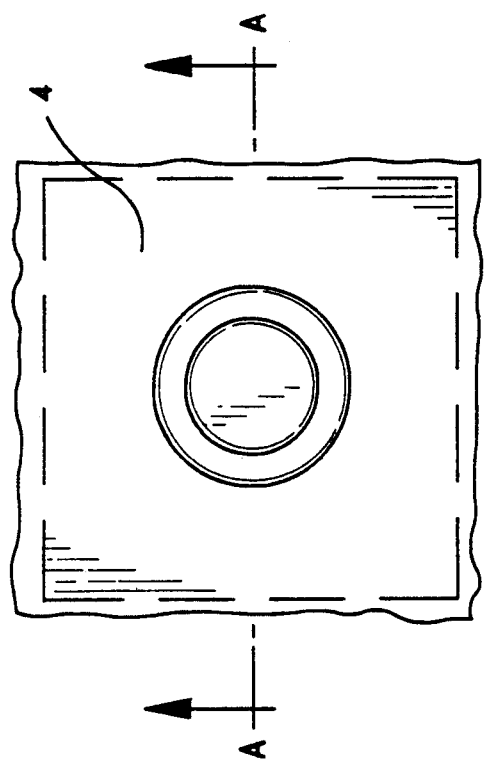
FIG. 3A is a top plane view of a portion of an SOI wafer being processed into the device of FIG. 1A, at a point in that process following depression etching.
Figure 3B:
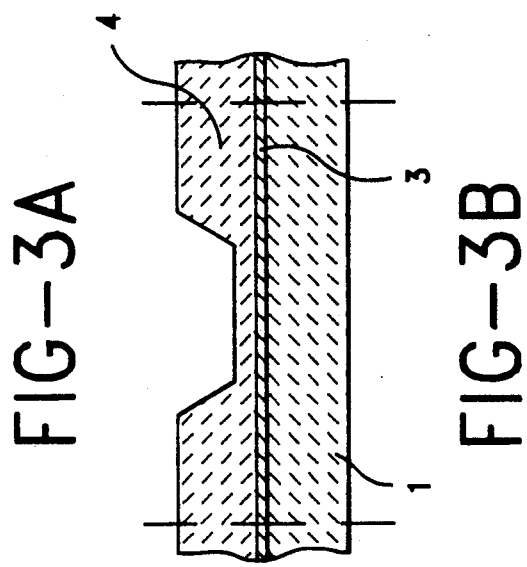
FIG. 3B is a side cross-sectional view of the portion of the wafer of FIG. 3A, along the line A—A of that figure.

This sensor is based upon an ungated MOSFET, the drain current of which varies as a function of the deflection of a diaphragm located in close proximity to the device. A complete pressure sensor is shown in FIGS. 1A and 1B. It consists of a sealed reference cavity 13, the body of which is etched out of a layer of $p^-$ seed silicon 4, and one wall of which is fabricated from a thin $p^+$ silicon diaphragm 12. The $p^+$ diaphragm is the seed silicon layer from a second SOI handle wafer (the handle wafer was removed after the diaphragm was bonded to the body of the sensor). Implanted $n^+$ electrodes 6, 7 inside of the reference cavity form the source and the drain of a sensing MOSFET, while the $p^+$ diaphragm provides an opposable gate. An implanted $p^+$ isolation electrode 9 separates the $n^+$ electrodes. Both the $p^+$ isolation electrode and $n^+$ electrode regions extend outside the sealed reference cavity, where they are contacted by metal bonding pads 14. Likewise, a metal bonding pad 16 also contacts the top of the diaphragm. External pressure on the diaphragm causes it to deflect, thus modulating the current flow in the MOSFET's channel (the flow of current between the source and drain).

The fabrication sequence for a particular embodiment of the pressure sensor is as follows:

Two SOI handle wafers are prepared, a base wafer 1 and a diaphragm wafer 2. These wafers may be either mono- or polycrystaline silicon.

Figure 2A:
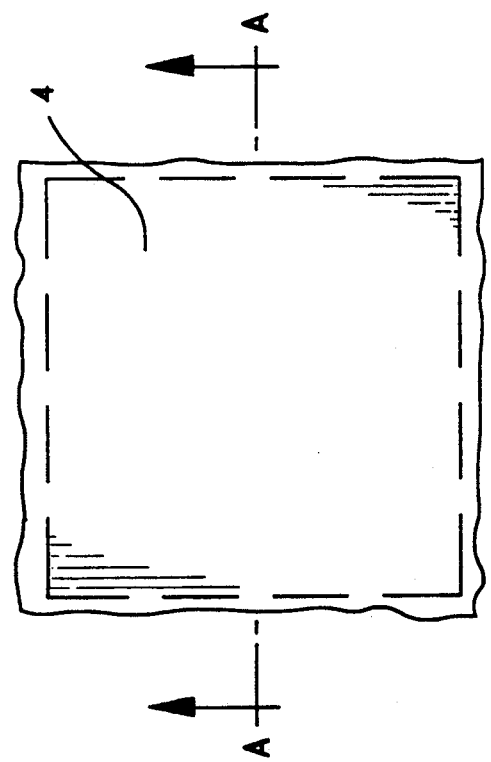
FIG. 2A is a top plane view of a portion of an SOI wafer being processed into the device of FIG. 1A, at a point in that process following seed layer bonding.
Figure 2B:
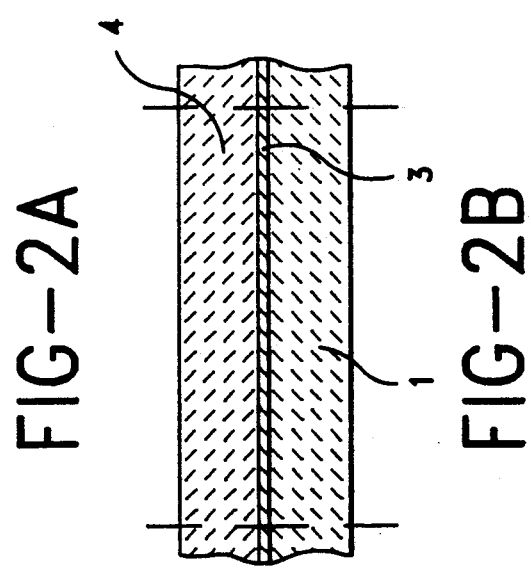
FIG. 2B is a side cross-sectional view of the portion of the wafer of FIG. 2A, along the line A—A of that figure.
Figure 7A:
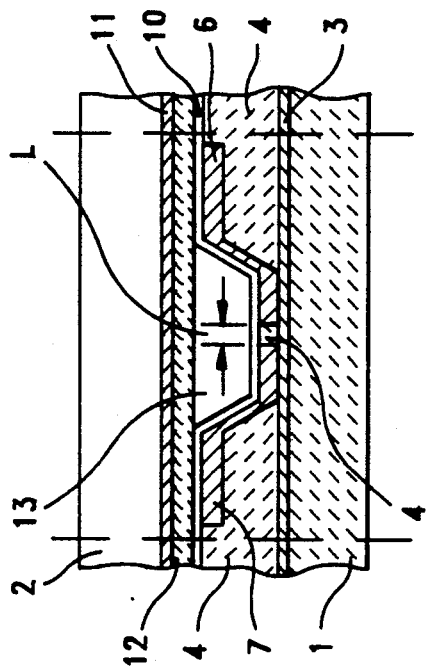
FIG. 7A is a top plane view of a portion of an SOI wafer being processed into the device of FIG. 1A, at a point in that process following diaphragm layer/gate oxide bonding.
Figure 7B:
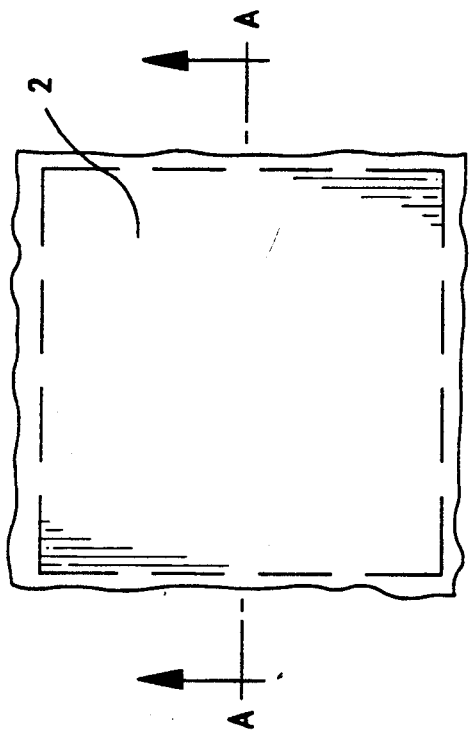
FIG. 7B is a side cross-sectional view of the portion of the wafer of FIG. 7A, along the line A—A of that figure.

A layer of bonding oxide 3 is grown on one face of the base SOI handle wafer, and a $p^-$ silicon seed layer 4 is bonded to that oxide; the resultant structure is illustrated in FIGS. 2A and 2B (the dotted lines in FIG. 2B represent the boundaries within the silicon wafer along which the finished device would be diced or sawed). This seed layer will be used to fabricate the device's reference cavity and must be sufficiently thick so as to allow a suitable separation between the sensor diaphragm (which will form the roof of the cavity) and the floor of the reference cavity (which will be formed by the base of a depression which will ultimately be etched into the $p^-$ seed layer). A thickness of approximately 20 $\mu m$ would be sufficient. A depression is then etched in this seed layer to form the foundation of the sensor reference cavity (see FIGS. 3A and 3B). After etching, the remaining $p^-$ silicon at the bottom of the depression should be thin enough (on the order of 200 nm) to allow the ion implantation of a source electrode, a drain electrode, and an isolation ring, fully through the $p^-$ silicon. A buried etch stop, either implanted or epitaxially grown $p^{++}$ material, may be used to ensure a precise final layer thickness; however, this etch stop layer would have to be removed before proceeding with further processing of the device.

Figure 6A:
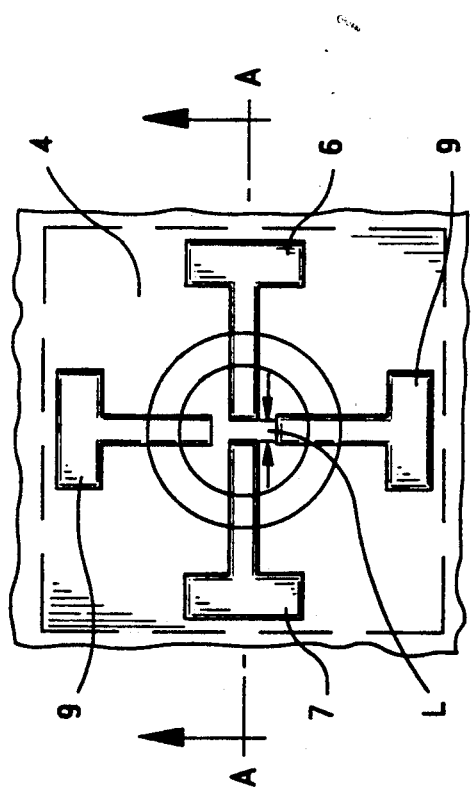
FIG. 6A is a top plane view of a portion of an SOI wafer being processed into the device of FIG. 1A, at a point in that process following the removal of the isolation ring masking oxide.
Figure 6B:
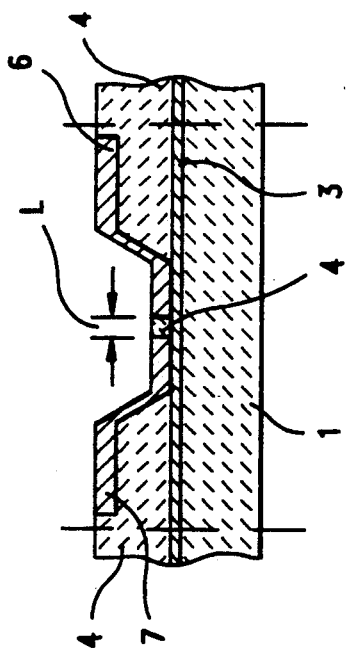
FIG. 6B is a side cross-sectional view of the portion of the wafer of FIG. 6A, along the line A—A of that figure.

Next, an oxide 5 is grown over the $p^-$ seed layer and patterned as a mask for the ion implantation of the $n^+$ source 6 and drain 7 electrodes (see FIGS. 4A and 4B). These electrodes are then implanted so that they pass fully through the $p^-$ material which forms the base of the etched depression. The oxide mask is then removed. The channel length L of the device is the distance separating the drain electrode from the source electrode. As shown in FIGS. 5A and 5B, another layer of oxide 8 is then grown over the $p^-$ seed layer and the implanted $n^+$ electrodes. This second oxide is patterned as a mask for the ion implantation of a $p^+$ isolation electrode 9. The isolation ring is then implanted so that it too passes fully through the base of the etched depression in the $p^-$ silicon; the oxide mask is then removed. The $n^+$ and $p^+$, which are shown in FIGS. 6A and 6B, can then be activated simultaneously, by using, for example, rapid thermal annealing.

A gate quality, low impurity, low defect oxide 10 is then grown over the entire surface of the $p^-$ seed layer, including those areas in which the $n^+$ and $p^+$ implants had been made. This oxide will serve as both the gate oxide of the sensing MOSFET and a bonding oxide for the attachment of the sensor's diaphragm.

A layer of bonding oxide 11 is then deposited or grown on the SOI diaphragm handle wafer. A layer of $p^+$ silicon (or polysilicon) 12, of the appropriate thickness to form the sensor diaphragm (on the order of tens of microns), is then formed over this bonding oxide. This $p^+$ material could be bonded to the handle wafer and then etched or polished back to the appropriate thickness, or deposited or grown upon the handle wafer. Next, the exposed surface of this $p^+$ layer is bonded to the gate quality oxide layer which had been grown on the $p^-$ silicon seed layer (see FIGS. 7A and 7B). This bonding forms and seals the sensor reference cavity 13. The bonding may be performed under a vacuum, thus insuring a good reference for the sensor, or alternately at atmospheric pressure. However, if done at atmospheric pressure, a means must be provided whereby the sensor's cavity may be later evacuated and sealed (such as an etched hole through the base of the sensor and into the sensor cavity). As illustrated in FIGS. 8A and 8B, the $p^+$ diaphragm layer is then separated from the bonding oxide attaching it to the diaphragm handle wafer.

In order to allow contact pads 14 to be affixed to the source electrode, the drain electrode, and the isolation ring, openings 15 are etched through the p+ diaphragm layer 12 and the gate quality bonding oxide 10, as is shown in FIGS. 9A and 9B. The contact pads may then be deposited and patterned using standard methods, and any suitable metal (such as aluminum or cobalt silicide). A contact pad 16 is also deposited on the surface of the silicon diaphragm, so as to provide an electrical connection to the gate of the device.

If desired, a passivation layer may be deposited on the surface of the device prior to the final processing step of sawing or dicing of the wafer to separate the individual sensors. This passivation layer could be silicon dioxide, silicon nitride, a polyimide material, or any other suitable, non-reactive substance.

A second embodiment of this device would employ a standard, bulk silicon wafer in place of the base SOI wafer. This would reduce the cost of the device as only one SOI wafer would be required for fabrication. However, the use of a standard silicon wafer would also introduce some unwanted parasitics.

The above described methods of fabrication would easily allow for signal processing or conditioning circuitry (to be used in conjunction with the sensor) to be fabricated on either the p+ diaphragm layer or the p− base seed layer of the device. Monolithic integration of this circuitry with the sensor would improve the reliability of the overall sensor/circuitry package by eliminating the need for several wire bonds which would otherwise be used to effect their interconnection.

In the operation of a device fabricated by the above described methods, a voltage $V_D$ would be applied to the drain, and a voltage $V_G$ would be applied to the gate (diaphragm). Pressure would be measured as a function of the drain current $I_D$, which is given by the basic "square law" equation governing an Isolated Gate MOSFET below saturation voltage:

$$I_D = \frac{Z\bar{\mu}_n C_0}{L}\left[(V_G - V_T)V_D - \frac{V_D^2}{2}\right]$$

if $0 \leq V_D \leq V_{Dsat}$, and $V_G \geq V_T$, where
- $I_D$ is the drain current,
- Z is the channel width,
- L is the channel length,
- $\bar{\mu}_n$ is the effective mobility in the inverted channel,
- $V_G$ is the gate (diaphragm) bias voltage,
- $V_T$ is the threshold voltage,
- $V_D$ is the draw voltage, and
- $C_0$ the capacitance per unit area of the gate.

If a physical displacement of the gate is to be used as a means of sensing pressure (with air as the dielectric), then there are two possibilities:

(i) the gate voltage $V_G$ can be maintained constant by connecting a voltage source to it; or (ii) the charge on the gate can be maintained constant by disconnecting the gate after charging the gate capacitance $C_0$.

In case (i), the drain current $I_D$ is of the form:

$$I_D = \frac{K\epsilon_0}{t},$$

where t is the spacing between the diaphragm and the base of the sensing cavity, and $$K = \frac{Z\bar{\mu}_n}{L}\left[(V_G - V_T)V_D - \frac{V_D^2}{2}\right].$$

The rate of change of $I_D$ is therefore given by:

$$\frac{dI_D}{dt} = \frac{-K\epsilon_0}{t^2},$$

which shows that the drain current reduces with increasing t.

In case (ii), $I_D$ can be expressed as:

$$I_D = \frac{Z\bar{\mu}_n C_0}{L}(V_G - V_T)V_D - \frac{Z\bar{\mu}_n C_0}{L}\frac{V_D^2}{2}.$$

Since the charge on the gate $C_0(V_G - V_T)$ is held constant, the rate of change of drain current becomes:

$$\frac{dI_D}{dt} = \frac{Z\bar{\mu}_n}{L}V_D^2\frac{\epsilon_0}{t_2}.$$

The drain current now increases with increasing t.

Figure 10:
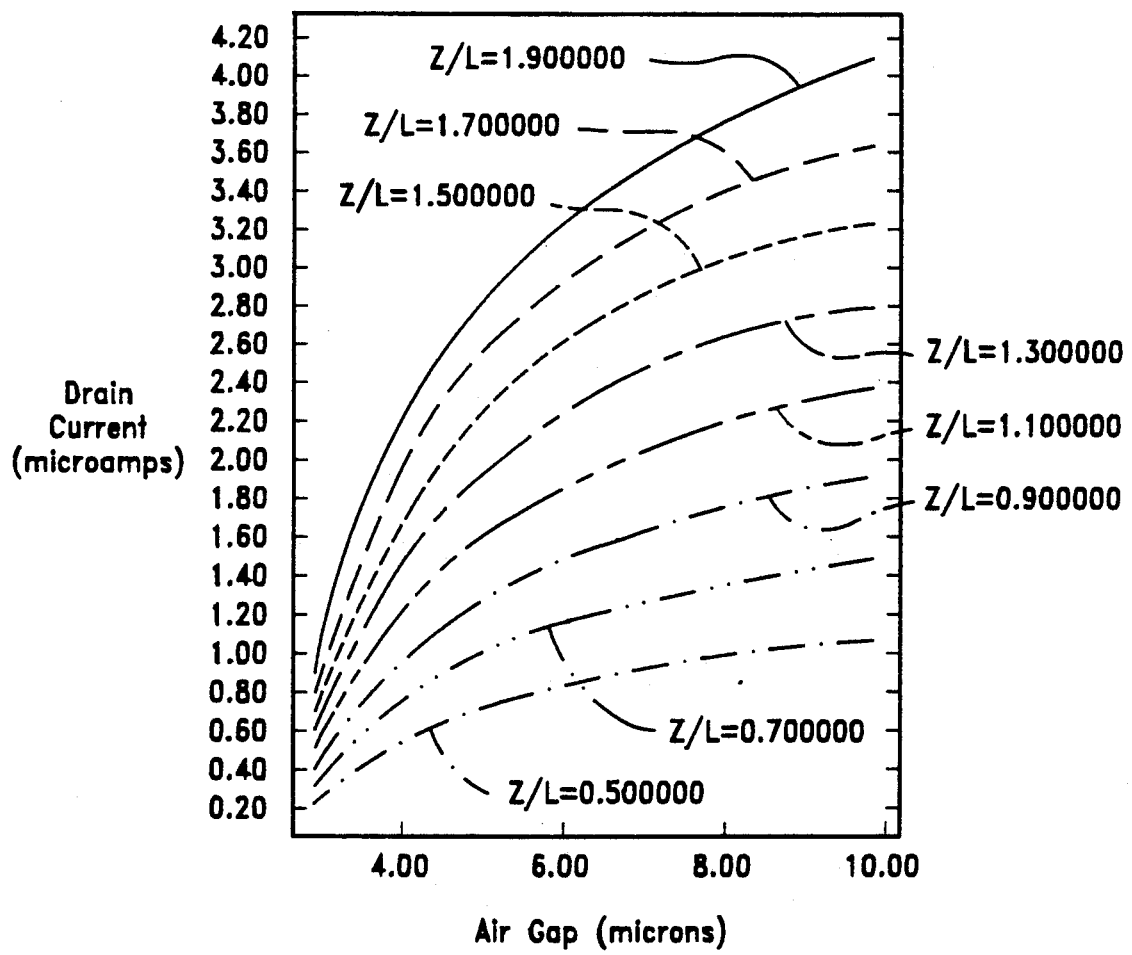
FIG. 10 is a graph of drain current versus air-gap length for an Isolated Gate MOSFET with a constant charge maintained on its gate.

FIG. 10 shows a graph of $I_D$ as a function of t and Z/L ratio for a sensor, the gate of which is being maintained at a constant charge. The following parameters were used for the calculations from which this graph was derived:

$\bar{\mu}_n = 650 \text{ cm}^2 V^{-1} s^{-1}$ $V_D = 5V$ $C_0(V_G - V_T) = 8.85e - 10$ It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A method of fabricating a pressure sensor, which comprises:
   forming a layer of oxide on one face of a first silicon-on-insulator handle wafer;
   attaching a layer of doped silicon to the oxide upon the first handle wafer, said doped silicon layer being sufficiently thick so as to allow for the formation of a cavity in said layer;
   forming a cavity in the doped silicon layer, so that the doped silicon layer comprises the base of the cavity as well as a continuous wall about the perimeter of said cavity;
   forming a drain electrode on a portion of the doped silicon layer, said drain electrode being comprised of an area within the doped silicon layer which is doped with impurities of an opposite polarity than those used to dope the doped silicon layer, and said drain electrode including a region extending from the exposed surface of the base of the cavity in the doped silicon layer to the surface of the oxide below the doped silicon layer;

forming a source electrode on a portion of the doped silicon layer, said source electrode being comprised of an area within the doped silicon layer which is doped with impurities of an opposite polarity than those used to dope the doped silicon layer, and including a region extending from the exposed surface of the base of the cavity in the doped silicon layer to the surface of the oxide below the doped silicon layer, and said source electrode being situated so that the portion of the source electrode within the cavity is offset from the drain electrode located within the cavity by a small gap area of the doped silicon layer which comprises the base of the cavity;

forming an isolation electrode on a portion of the doped silicon layer, said isolation electrode being comprised of an area within the doped silicon layer which is doped with impurities of the same polarity as those used to dope the doped silicon layer but at a higher concentration, and said isolation electrode including a region extending from the exposed surface of the base of the cavity in the doped silicon layer to the oxide below the doped silicon layer, and said isolation electrode being situated so that portions of it flank the gap area separating the source and drain electrodes;

forming a layer of gate oxide over the surface of the electrodes, as well as the remainder of the doped silicon layer;

forming a layer of bonding oxide on one face of a second silicon-on-insulator handle wafer;

forming a diaphragm layer of silicon over the oxide upon the second handle wafer, said diaphragm layer being comprised of silicon, or polysilicon or amorphous silicon which is doped with impurities of the same polarity as the impurities used in doping the doped silicon layer but at a higher concentration, and said diaphragm layer being of a suitable thickness for a deformable diaphragm;

bonding the gate oxide layer to the exposed face of the silicon diaphragm layer so as to seal the cavity in the doped silicon layer;

removing the second silicon-on-insulator handle wafer and the bonding oxide layer from the silicon diaphragm layer;

removing portions of both the silicon diaphragm and gate oxide layers so as to expose an area of each of the electrodes; and affixing a metallic contact pad to the exposed area of each of the electrodes, as well as to a portion of the surface of the silicon diaphragm layer.

2. A method of fabricating a pressure sensor, which comprises:

forming a layer of oxide on one face of a first silicon-on-insulator handle wafer;

attaching a layer of doped silicon to the oxide upon the first handle wafer, said doped silicon layer having a thickness of approximately 20 microns;

forming a cavity within the doped silicon layer, so that a portion of the doped silicon layer forms a continuous wall about the perimeter of said cavity, and so that a portion of the doped silicon layer having a thickness of approximately 200 nanometers comprises the base of the cavity;

forming a drain electrode on a portion of the doped silicon layer, said drain electrode being comprised of an area within the doped silicon layer which is doped with impurities of an opposite polarity and at a higher concentration than those used to dope the doped silicon layer, and said drain electrode including a region extending from the exposed surface of the base of the cavity in the doped silicon layer to the surface of the oxide below the doped silicon layer;

forming a source electrode on a portion of the doped silicon layer, said source electrode being comprised of an area within the doped silicon layer which is doped with impurities of an opposite polarity than those used to dope the doped silicon layer, and including a region extending from the exposed surface of the base of the cavity in the doped silicon layer to the surface of the oxide below the doped silicon layer, and said source electrode being situated so that the portion of the source electrode within the cavity is offset from the drain electrode located within the cavity by a small gap area of the doped silicon layer which comprises the base of the cavity;

forming an isolation electrode on a portion of the doped silicon layer, said isolation electrode being comprised of an area within the doped silicon layer which is doped with impurities of the same polarity as those used to dope the doped silicon layer but at a higher concentration, and said isolation electrode including a region extending from the exposed surface of the base of the cavity in the doped silicon layer to the oxide below the doped silicon layer, and said isolation electrode being situated so that portions of it flank the gap area separating the source and drain electrodes;

forming a layer of gate oxide over the surface of the electrodes, as well as the remainder of the doped silicon layer;

forming a layer of bonding oxide on one face of a second silicon-on-insulator handle wafer;

forming a diaphragm layer of silicon over the oxide upon the second handle wafer, said diaphragm layer being comprised of silicon, or polysilicon, or amorphous silicon which is doped with impurities of the same polarity as the impurities used in doping the doped silicon layer but at a higher concentration, and said diaphragm layer being of a suitable thickness for a deformable diaphragm;

bonding the gate oxide layer to the exposed face of the silicon diaphragm layer so as to seal the cavity in the doped silicon layer;

removing the second silicon-on-insulator handle wafer and the bonding oxide layer from the silicon diaphragm layer;

removing portions of both the silicon diaphragm and gate oxide layers so as to expose an area of each of the electrodes; and affixing a metallic contact pad to the exposed area of each of the electrodes, as well as to a portion of the surface of the silicon diaphragm layer.

3. A method as described by claim 1, including:

performing the bonding of the doped silicon diaphragm layer to the gate oxide layer under a vacuum for insuring that the sealed cavity formed by said bonding is evacuated.

4. A method as described by claim 2, including:

performing the bonding of the doped silicon diaphragm layer to the gate oxide layer under a vacuum for insuring that the sealed cavity formed by said bonding is evacuated.

5. A method as described in claim 1, including:

positioning a buried layer of silicon, doped with impurities of the same polarity as the impurities used to dope the doped silicon layer but at a higher concentration, within the doped silicon layer at a level at which the base of the cavity within the doped layer is desired to be formed, and removing said buried layer after said cavity is etched and prior to any further processing being performed.

6. A method as described by claim 2, including:

positioning a buried layer of silicon, doped with impurities of the same polarity as the impurities used to dope the doped silicon layer but at a higher concentration, within the doped silicon layer at a level at which the base of the cavity within the doped layer is desired to be formed, and removing said buried layer after said cavity is etched and prior to any further processing being performed.

* * * * *